US007342889B2

(12) United States Patent
Harrekilde-Petersen et al.

(10) Patent No.: US 7,342,889 B2
(45) Date of Patent: Mar. 11, 2008

(54) MEANS AND A METHOD FOR SWITCHING DATA PACKETS OR FRAMES

(75) Inventors: Kal Harrekilde-Petersen, Malmo (SE); Peter Ostergaard Nielsen, Lyngby (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 827 days.

(21) Appl. No.: 10/617,884

(22) Filed: Jul. 14, 2003

(65) Prior Publication Data
US 2004/0081145 A1 Apr. 29, 2004

Related U.S. Application Data

(63) Continuation of application No. 10/289,226, filed on Nov. 7, 2002, now abandoned.

(60) Provisional application No. 60/365,118, filed on Mar. 19, 2002, provisional application No. 60/344,473, filed on Nov. 9, 2001.

(51) Int. Cl.
*G08C 15/00* (2006.01)

(52) U.S. Cl. ..................................... 370/236; 370/442
(58) Field of Classification Search ................ 370/236, 370/437, 442, 451, 452
See application file for complete search history.

(56) References Cited

U.S. PATENT DOCUMENTS 5,822,300 A * 10/1998 Johnson et al. ............. 370/229
6,570,848 B1 * 5/2003 Loughran et al. ......... 370/230.1
2002/0075886 A1 * 6/2002 Tagore-Brage et al. ..... 370/424

* cited by examiner

*Primary Examiner*—Chau Nguyen
*Assistant Examiner*—Kenneth R Hartmann
(74) *Attorney, Agent, or Firm*—Christie, Parker & Hale, LLP

(57) ABSTRACT

A switching means and method where a number of devices exchange data on a data bus. Each device has at least one data port and at least one of the devices has a plurality of data ports. The data ports may have different data rates. An arbitration takes into account availability or congestion of the ports before allowing data transport from device to device. The devices communicate directly over a cross bar.

30 Claims, 6 Drawing Sheets

XGMII

MEANS AND A METHOD FOR SWITCHING DATA PACKETS OR FRAMES

Figure 1:
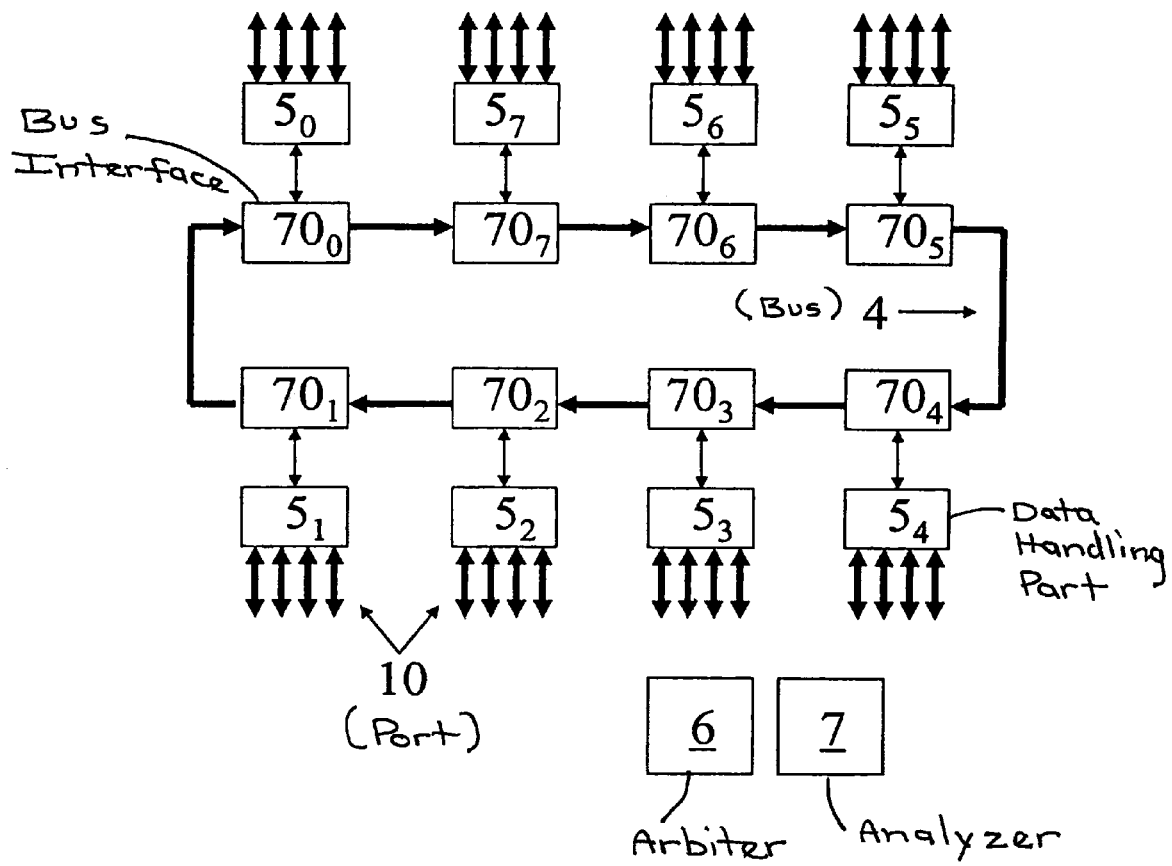

This application is a continuation of application Ser. No. 10/289,226, filed on Nov. 7, 2002 now abandoned, the entire contents of which are hereby incorporated by reference and for which priority is claimed under 35 U.S.C. § 120; and this application claims priority of Application No. 60/365,118 filed in USA on Mar. 19, 2002 and Application No. 60/344,473 filed in USA on Nov. 9, 2001 under 35 U.S.C. § 119.

BACKGROUND OF THE INVENTION

The present invention relates to a means and a method for switching data, such as data packets or frames, where a number of devices each communicating with one or more I/O ports communicate with each other via a data bus.

A number of normal switches are known implementing a number of I/O ports all enabling the same, highest data rate. In this situation, they may all communicate with a backbone bus with the same data rate. A problem is, however, seen where I/O ports with different highest data rates are to be provided.

This problem is solved in e.g. EP-A-1162798 where a common storage is provided where the individual I/O port's access to this common storage and the common data bus is then related to the data rate of the I/O port. However, in this manner, one port's communication with the common storage will prevent all other ports from communicating therewith during that period of time.

Other technologies may be seen in U.S. Pat. No. 6,335,932 and WO00/72524.

SUMMARY OF THE INVENTION

In a first aspect, the invention relates to a means for switching data, the means comprising:
  a data bus,
  a plurality of devices adapted to exchange data with each other via the data bus, each device being adapted to receive data from and transmit data to at least one corresponding I/O port, at least one first device being adapted to receive data from and transmit data to a plurality of corresponding I/O ports,
  arbiter means for determining an order of exchanging, on the data bus, of data between the devices, the devices being adapted to:
  receive and store data from a corresponding I/O port,
  transmit, to the arbiter, information relating to congestion or availability of a—and preferably each—corresponding port,
  receive, from the arbiter, information indicating whether the received data may be transmitted over the data bus,
  transmit, if the information received indicates that the data may be transmitted, the data over the data bus, and
  receive data from the data bus and forward the received data to a corresponding I/O port, the arbiter being adapted to:
  receive, from the devices, the congestion or non-availability information, and
  determine the order of exchanging data on the basis of the congestion information.

Normally, each I/O port is adapted to communicate with one or more computers or networks.

Thus, at least one of the devices will have a plurality of ports presenting a challenge in the arbiting etc in that these ports have a single "connection" to the data bus. Other devices may have only one or a different number of ports.

In the present context, there may be multiple reasons as to why a port or device is not available. One reason is congestion therein whereby the port is not able to transmit data received. Another reason is that the bandwidth out of the port compared to that from device to device might fill buffers in the device or port so that a reduction or temporary pause in the transmission is desired. This also is a type of congestion.

In the present context, the exchanging of data on the data bus may be performed either serially, in parallel, time division multiplexed, by a series of devices at the same time, in a staggered fashion, or in a systolic manner.

In the preferred embodiment, two devices may communicate via the bus and other devices receiving the packet intermediately during the transmission of the packet on the bus between the transmitting and the receiving devices. A plurality of the devices is preferably adapted to exchange data with each other directly over the data bus at at least substantially the same rate. In this manner, the data bus is a cross bar and not just data exchange bus. The preferred data bus is a ring-shaped bus formed by the devices each being adapted to receive data from another device and transmit data to yet another device.

In the presently preferred embodiment, the devices are positioned as pearls on a string formed by the data bus. The devices exchange data by forwarding data at the same direction along the ring and from device to device. This may be performed systolically in that all devices may, in fact, forward data to the next device. When a device receives data, it will determine whether the data is for that device—and simply forward the data if this is not the case—or if the data is also targeted for other devices.

Presently, the pieces of data may be any type of data, such as a data packet or frame conforming to a standard, such as to the Ethernet, IEEE 802.3, SONET, and/or Token Ring standard. In the present context, a data packet or frame may be any collection of data and other information. Normally, a data packet or frame will have a header with addressing or routing information and a data part or payload carrying the data to be routed or transported. The data may, outside the present system or method be transported or exist as one type, such as data packets or cells with fixed or varying sizes—and may, nonetheless, be exchanged inside the present system in another manner, such as as fixed-size cells.

Preferably, the devices are adapted to establish a connection between a transmitting device and a receiving device—a connection which is removed when the data has been transmitted. In this manner, data exchange between a device having slower ports and a device having faster ports will ensure that the packet or frame is swiftly transmitted without the device with the faster port(s) being stalled. Preferably, the receiving device comprises means for receiving and holding the data received before transmission to the intended port(s).

A first number of the I/O ports may enable a highest first, higher data receiving/transmitting rate, and a second number of the I/O ports may enable a highest second, lower data receiving/transmitting rate being lower than the higher rate, In one situation, at least one I/O port will further enable one or more other data receiving/transmission rate(s) being lower than its highest data rate. This would be the case for e.g. tri-speed ports (ports enabling both 1 Gbit/s, 100 Mbit/s and 10 Mbit/s depending on the capabilities of the other networking elements with which the ports communicate).

In communication, standardized data rates normally are factors of each other. In Ethernet, the data rates are factors of 10 (10 Mbit/s, 100 Mbits, 1 Gbit/s, 10 Gbit/s) and in SONET, the factor is 4. Thus, normally, the higher, first data rate would normally be an integer times the lower, second data rate.

Preferably, each device is able to receive data from the data bus and transmit data to the data bus at at least the first rate. When the rates of the ports of each device may add up to a predetermined maximum data rate—or a rate below the maximum rate—the rate with which the devices are adapted to communicate over the bus would normally be higher than that maximum rate in order to have a speed-up factor on the bus.

In a preferred embodiment, each device could be operationally connected to either one or more of the I/O ports of the first group or a plurality of the I/O ports of the second group. Alternatively, the device could have the same number of first and second I/O ports.

Preferably, at least one device comprises a memory means comprising a number of data queues for holding data received from one or more I/O ports and/or from the data bus. The memory means may have one or more data queues for each of the I/O ports. Also, the at least one second device could further comprise an interface which may be altered between a first embodiment having a first combination of first and second I/O ports and a second embodiment having a second combination of first and second I/O ports, the memory means being adapted to provide, in each of the first and second embodiments, one or more queues for each I/O port embodied by the interface. Also, it may be desired that a queue for a first I/O port has a size different from a queue for the second I/O port.

This interface may, in the first embodiment, have a plurality of the second I/O ports and, in the second embodiment, one or more of the first I/O ports, the memory means being adapted to, in the first embodiment, comprise a first number of queues per first I/O port of the interface and, in the second embodiment, comprise a second number of queues per second I/O port of the interface.

The numbers of queues may be the same, such as one for each priority.

Preferably, the arbiter is adapted to provide, to the at least one first device, information relating to which of the device's one or more corresponding ports is allowed to transmit data. This will facilitate transmission in the situation where more than one port wishes to transmit and where it is not unimportant which one transmits data (if one e.g. wishes to transmit data to a congested port).

Preferably, the arbiter is adapted to examine, for the at least one first device, whether a first port of the plurality of ports wishes to transmit data to a congested or non-available port and to, if so, examine whether another port of the plurality of ports wishes to transmit data to a non-congested or available port and, if so, transmit, to the at least one first device, information relating to the other port being allowed to transmit data.

Thus, a port, which wishes to transmit data to an available port or device, is selected (if any such exists). In this context, also a priority of the data (see below) may be taken into account so that each transmission is evaluated on the basis of its priority.

Also, preferably, the at least one first device is adapted to determine to which I/O port to transmit data received from the data bus as it will receive all data from the same data bus. Such determination may be made on the data itself or on additional data transmitted to the device either as part of the data or in addition thereto (on the data bus or in parallel thereto).

Normally, the determined switching/exchanging order of the arbiter may be determined so that data is only allowed to be forwarded on the data bus when it is for a non-congested or available port. However, in an interesting embodiment, a device is adapted to determine congestion at a corresponding I/O port and to transmit corresponding information to the arbiter, and wherein the arbiter is adapted to override any congestion or non-availability of a receiving device or I/O port when a congested I/O port wishes to transmit data thereto, and inform the pertaining device that the congested I/O port is allowed to transmit data. This may be the only exception to the above situation.

Thus, even though there is congestion at the egress side of a device, congestion in the ingress side in the receiving device may overrule the congestion and thereby facilitate exchange of the data—and transfer the data overflow problem to the egress side, which may then decide to drop the data.

Preferably, each device is adapted to transmit all pieces of data received at the corresponding I/O ports to the data bus. Thus, no internal switching takes place in the device between the individual ports. In this manner, the device may be less complex.

The present means preferably comprises at least one device further comprising a processing means adapted to:
provide a priority for each packet or frame received at its I/O port(s),
divide each packet or frame received at its I/O port(s) into cells before transmission thereof to the data bus and to assemble cells received from the data bus into frames or packets before outputting from an I/O port,
process each packet or frame received at an I/O port, and/or
derive, from each packet or frame received at an I/O port, information for transmission to the arbiter This device could comprise a processing means for each I/O port of the device.

Also, the means could further comprise a Look-Up Engine adapted to receive information relating to each piece of data received at an I/O port and to derive, from the information, identifying information relating to one or more I/O port(s) or device(s) to receive the piece of data. Then, each device could further be adapted to derive, from each piece of data received, information relating to the piece of data, to transmit the information to the LU Engine, receive identifying information from the LU Engine, and to exchange the identifying information on the data bus together with the piece of data (such as as fixed-size cells). In the last situation, the data and identifying information could be stored subsequent to receipt of the identifying information and prior to exchange thereof on the data bus and/or at least one device could be adapted to, on the basis of the identifying information, determine whether the data is addressed for the device or not—and then to forward the data along the data bus if the data is not for this device.

In one embodiment, the at least one third device has means for providing a priority for each piece of data received at its corresponding I/O port(s), and wherein the arbiter is adapted to determine the order of exchanging data also on the basis of the priority of the data.

This priority may be used both in the arbiter for giving priority to high priority data—that is, switching/exchanging high priority data first and only lower priority data when this may be exchanged together with the high priority data to be exchanged (or the lower priority data has waited sufficiently long). This priority may also be used for storing the data such as in different queues—and the availability/congestion data may be specified for both port/device and priority so that a given port may actually be congested—but only for e.g. a given priority.

Also, the arbiter may be adapted to, when more than one port or device is to receive a piece of data received by a receiving device, determine which of the ports and devices are available or non-congested and transmit information to the receiving device in order to have it forward the data to those ports and devices, and subsequently, when other of the ports or devices are available or non-congested, informing the receiving device to forward the data to those devices or ports.

In this manner, transmission is not delayed in transmission to all ports because some of the ports are not available. Firstly transmitting to the available ports and subsequently to the remaining (or performing the transmission in even more steps) enhances the speed of the cross bar.

A second aspect of the invention relates to a method of switching data in a switching means comprising:
 a data bus,
 a plurality of devices adapted to exchange data with each other via the data bus, each device being adapted to receive data from and transmit data to at least one corresponding I/O port (each preferably being adapted to communicate with one or more computers or networks), at least one first device being adapted to receive data from and transmit data to a plurality of corresponding I/O ports, and
 arbiter means for determining an order of exchanging, on the data bus, of data between the devices, the method comprising each device:
 receiving and storing data from a corresponding I/O port,
 transmitting, to the arbiter, information relating to congestion or availability of a (and preferably each) corresponding port,
 receiving, from the arbiter, information indicating whether the received data may be transmitted over the data bus,
 transmitting, if the information received indicates that the data may be transmitted, the data over the data bus, and
 receiving data from the data bus and forward the received data to a corresponding I/O port, and the arbiter:
 receiving, from the devices, the congestion or non-availability information, and
 determining the order of exchanging data on the basis of the congestion information (preferably so that data is only allowed to be forwarded on the data bus when it is for a non-congested or available port).

Again, the data bus may be used as a crossbar when a plurality of the devices (and preferably all devices) exchange data with each other directly over the data bus at at least substantially the same rate. In this situation, a first number of the I/O ports may enable a highest first, higher data receiving/transmitting rate, and a second number of the I/O ports may enable a highest second, lower data receiving/transmitting rate being lower than the higher rate. Also, at least one I/O port preferably further enables one or more other data receiving/transmission rate(s) being lower than its highest data rate, each device preferably receives data from the data bus and transmits data to the data bus at at least the first rate, and each device may communicate with either one or more of the I/O ports of the first group or a plurality of the I/O ports of the second group.

In the preferred embodiment, at least one second device stores pieces of data received from the one or more corresponding I/O ports and/or from the data bus in a memory means comprising a number of data queues for holding pieces of data. Then, the at least one second device may store the pieces of data in one or more data queues for each of the corresponding I/O port(s). Also, the at least one second device may further comprise an interface which alters between a first embodiment, having a first combination of first and second I/O ports, and a second embodiment, having a second combination of first and second I/O ports, the memory means providing, in each of the first and second embodiments, one or more queues for each I/O port embodied by the interface. In that situation, the interface, in the first embodiment, may have a plurality of the second I/O ports and, in the second embodiment, have one or more of the first I/O ports, the memory means, in the first embodiment, comprising a first number of queues per first I/O port of the interface and, in the second embodiment, comprising a second number of queues per second I/O port of the interface.

Preferably, the arbiter receives information relating to each piece of data (such as a data packet or frame) received at the I/O ports, the information comprising an I/O port and/or a device to receive the data.

Also, the arbiter preferably provides, to the at least one first device, information relating to which of the corresponding ports is allowed to transmit data. In that situation, the arbiter preferably examines, for the at least one first device, whether a first port of the plurality of ports wishes to transmit data to a congested or non-available port and to, if so, examines whether another port of the plurality of ports wishes to transmit data to a non-congested or available port and, if so, transmits, to the at least one first device, information relating to the other port being allowed to transmit data.

In a preferred embodiment, the at least one first device determines to which of its corresponding I/O ports to transmit data received from the data bus.

Also, in a preferred embodiment, a device determines congestion at a receiving portion of a corresponding I/O port and transmits corresponding information to the arbiter, and wherein the arbiter overrides any congestion or non-availability of a receiving device or I/O port when a congested I/O port wishes to transmit data thereto, and informs the pertaining device that the congested I/O port is allowed to transmit data.

Each device may transmit all pieces of data received at the pertaining I/O ports to the data bus.

Normally, if a normal switching behaviour is desired, at least one third device could further comprise one or more of the processing steps of:
 providing a priority for each packet or frame received at its I/O port(s),
 dividing each packet or frame received at its I/O port(s) into cells before transmission thereof to the data bus and assembling cells received from the data bus into frames or packets before outputting from an I/O port,
 processing each packet or frame received at an I/O port, and
 deriving, from each packet or frame received at an I/O port, information for transmission to the arbiter.

Then, the at least one third device could perform one or more processing steps for each I/O port of the device, and/or could perform the step of providing a priority for each piece of data received at its corresponding I/O port(s), and wherein, then, the arbiter could determine the order of exchanging data also on the basis of the priority of the data.

Preferably, the method further comprises the step of a Look-Up Engine receiving information relating to each piece of data received at an I/O port and deriving, from the information, identifying information relating to one or more I/O port(s) or device(s) to receive the piece of data. Then, each device could further derive, from each piece of data received, information relating to the piece of data, transmit the information to the LU Engine, receive identifying information from the LU Engine, and exchange the identifying information on the data bus together with the piece of data. Also, the data and identifying information may be stored subsequent to receipt of the identifying information and prior to interchange thereof on the data bus. Also, at least one fourth could device determine, on the basis of the identifying information, whether the data is addressed for the device or not. Finally, the arbiter could determine, when more than one port or device is to receive a piece of data received by a receiving device, which of the ports and devices are available or non-congested and transmit information to the receiving device in order to have it forward the data to those ports and devices, and subsequently, when other of the ports or devices are available or non-congested, inform the receiving device to forward the data to those devices or ports.

Further aspects of the invention relates to an interface adapted to operate a plurality of groups of inputs/outputs independently of each other and aligned/synchronized with each other.

Naturally, any of the below aspects may be combined with any of the above aspects in order to obtain an even more interesting chip.

In general, the following aspects relate to an interface and a switch having the interface, where the interface may be used for both one or more higher data rate communications and a larger number of lower rate data communications.

Currently, high-speed Ethernet ports are either dedicated 10 GbE or 1 GbE, each interface requiring a different number of pins on a chip. One aspect of this invention relates to how to reduce the necessary pin-count on multi-rate chips having both such interfaces.

That aspect of the present invention relates to the use of one standardized interface to support also a plurality of other interfaces using the same inputs/outputs.

The data to be transported on the interface may be provided in any form. Presently, it is preferred that the data is in XGMII format (32 bit serial data interface) for 10 Gbit/s Ethernet data traffic and GMII for the lower bit rate traffic. On the actual interface, the 10 Gbit/s data is preferably transmitted as a XAUI signal and four 1 Gbit/s signals are transmitted as serial communication. Naturally, it is also preferred that data received on the interface be transmitted in those formats.

In general, this represents a bonus compared to previous multi-rate Ethernet (industry) standards, where one high-speed port is degraded to a single low-speed port.

The main advantage is to the Customer, who will be able to configure each port of e.g. a switch or MAC into either 10 GbE mode or into a set of 1 GbE ports. For the manufacturer, the benefits are:

The ability to use the same macro for several purposes.
The reduction in chip runs, testing, and stock gained from folding multiple chips into one.

A third aspect of the invention relates to an interface comprising:
a plurality of means for serializing parallel data, each serializing means being adapted to output a serial data signal,
first means for providing a plurality of independent first parallel data, one first parallel data for each serializing means,
second means for providing second parallel data, for dividing the second parallel data into a plurality of third parallel data and for providing a third parallel data to each of the serializing means, and
means for aligning and/or synchronizing serial data signals output from the serializing means in order to obtain a predetermined timing relationship between the plurality of serial data signals.

In the present context, the aligning and/or synchronizing is an alignment or synchronizing in time so that a predetermined timing relationship exists between the data input and/or output. Preferably, aligned/synchronized signals will be operated at a common frequency and using a common data protocol.

Also, providing signals which are independent of each other will mean that the data represented is to be, or can meaningful be, interpreted independently.

Thus, individual data may be provided, serialized, transmitted etc. at e.g. different frequencies and some individual data may be treated independently of each other while others may be aligned/synchronized.

Preferably, the aligning/synchronizing means are adapted to not align/synchronize serial data signals output from the serializing means when receiving the first parallel data. In that manner, the individual first parallel data may be transmitted individually—such as with different or just free running clock frequencies.

Normally, the data will be presented as either a constant stream of data or as separate packets/frames/cells. Parallel data may represent a full packet/frame/cell across the width thereof—or a packet/frame/cell may be transmitted over a number of clock cycles on the parallel bus.

A fourth aspect of the invention relates to an interface comprising:
a plurality of means for serializing parallel data, each serializing means being adapted to output a serial data signal,
first means for providing a plurality of independent first parallel data, one first parallel data for each serializing means,
second means for providing second parallel data, for dividing the second parallel data into a plurality of third parallel data and for providing a third parallel data to each of the serializing means, and
means for aligning and/or synchronizing the third parallel data in order to obtain a predetermined timing relationship between the plurality of third serial data signals.

Preferably the aligning/synchronizing means are adapted to be disabled—such as when the first providing means are active.

It is presently preferred that the first and second providing means are not operated concurrently or simultaneously—so that only one of the first and second parallel data are provided to the serializing means at the time.

In the preferred embodiment, the first providing means is adapted to output each first parallel data along a first parallel data bus having a first predetermined number of conductors, wherein the second providing means is adapted to output the second parallel data along a second data bus having a second predetermined number of conductors, and wherein the first and second data busses have at least one conductor in common.

In this situation, the dividing of the second parallel data may simply be the dividing of the conductors of the second bus into a plurality of groups of conductors.

Preferably, the first predetermined number of conductors differs from the second number of conductors, and the first parallel data busses could be comprised in the second parallel data bus.

In fact, the plurality of serializing means times the first predetermined number of conductors is preferably identical to the second predetermined number of conductors.

It is desired that the first providing means is adapted to output first parallel data conforming to the GMII standard, wherein the second providing means could be adapted to output second parallel data conforming to the XGMII standard, and the serializing means be adapted to output a plurality of serial data signals conforming to the XAUI or the Infiniband standards—such as when the serial signals thereof are aligned. Otherwise, the output of the serializing means may be independently running serial communication—such as for communication over a plurality of SERDES connections or optical fibers.

Another aspect of the invention relates to an interface comprising:
a plurality of means for each receiving a serial data signal and for deserializing the serial data signal into parallel data,
means for aligning/synchronizing the serial data signals prior to deserialization in order to obtain a predetermined timing relationship between the plurality of parallel data, the aligning/synchronizing means being adapted to be disabled,
means for, when the aligning/synchronizing means are not disabled, combining the parallel data relating to deserialized aligned/synchronized serial signals into a single parallel piece of data or a single parallel stream of data.

A sixth aspect relates to an interface comprising:
a plurality of means for each receiving a serial data signal and for deserializing the serial data signal into parallel data,
means for aligning/synchronizing the plurality of parallel data in order to obtain a predetermined timing relationship between the plurality of parallel data, the aligning/synchronizing means being adapted to be disabled,
means for, when the aligning/synchronizing means are not disabled, combining the aligned/synchronized parallel data into a single parallel piece of data or a single parallel stream of data.

In the fifth and sixth aspects, preferably, the deserializing means are adapted to output each parallel data along a first parallel data bus having a first predetermined number of conductors, wherein combining means is adapted to output the single parallel data along a second data bus having a second predetermined number of conductors, and wherein the first and second data busses have at least one conductor in common. Again, the first predetermined number of conductors may differ from the second number of conductors. Also, the first parallel data busses are preferably comprised in the second parallel data bus, and the plurality of deserializing means times the first predetermined number of conductors is desirably identical to the second predetermined number of conductors.

In the preferred embodiment, the deserializing means are adapted to output first parallel data conforming to the GMII standard, wherein the combining means is adapted to output second parallel data conforming to the XGMII standard, and wherein the deserializing means are adapted to receive a plurality of serial data signals conforming to the XAUI or the Infiniband standards (when alignment makes sense—or else the data may be independent free running communication).

Preferably, in all the above second to sixth aspects of the invention, a means for providing a clocking signal for use in the serializing/deserializing means is provided. This clocking providing means could be adapted to provide a clocking signal having one of two clocking signal frequencies, where a clocking signal having one of the clocking signal frequencies is provided when each group of inputs/outputs are operated independently of each other and the other of the clocking signal frequencies is provided when the aligning means is operated. The one and the other clocking frequencies are preferably selected from the group consisting of 3.25 GHz, 1.25 GHz, and 2.5 GHz. The frequency of the one signal could be 1.25 GHz and the frequency of the other signal could be 3.25 GHz or 2.5 GHz.

It should be noted that the disabling of the aligning/synchronizing means may simply be means which route or transfer data around or "not via" the aligning/synchronizing means. Thus, an aligning/synchronizing means may be fully operable all the time—but it the disabling means may cause no data to be transmitted thereto, whereby it will, in effect, have no "apparent" operation. Alternatively, the first or second providing means and/or the combining means may be constantly operated at all times, where the routing/transferring of data simply routes the correct data to and from the serializing/deserializing means.

A seventh aspect of the invention relates to a communication system comprising a first interface according to the third or fourth aspects and a second interface according to the fifth or sixth aspects and means for transporting the plurality of serial signals from the first interface to the second interface, the system comprising means for processing the plurality of parallel data and/or the single parallel data output by the second interface, the processing means being adapted to process the plurality of parallel data independently of each other.

This system could be adapted to be operated in one of two modes of operation, comprising:
a first mode of operation wherein the aligning/synchronizing means of the first and second interfaces are operated, and
a second mode of operation wherein the aligning/synchronizing means of the first and second interfaces are disabled.

These two modes of operation will be one receiving/transmitting one stream of data or a single piece of data (at a point in time) or one receiving/transmitting a plurality of independent streams or pieces of data (at a point in time)—using the same serializing/deserializing means and the same transporting means.

Another aspect of the invention relates to a method of operating the interface of any of the third to sixth aspects, the method comprising:
determining whether the serial data signal(s) to be received and/or output is/are to be aligned and/or synchronized and
operating the aligning/synchronizing means accordingly.

Then, the determining step might comprise determining an overall data rate to be output or input via the interface and aligning/synchronizing the data if the data rate exceeds a predetermined threshold. Thus, the number of paths or connections to external computers, networks, network elements, chips or the like may be tailored as may the overall bandwidth of the system. Trunking may be used to reduce the number of connections or to increase the bandwidth—and this combined with the present choice of data rate and number of connections brings about a very powerful tailoring tool.

Thus, the determining step may comprise determining an overall data rate of the plurality of serial data signals and operating the aligning/synchronizing means if the data rate exceeds a predetermined threshold.

Naturally, the opposite situation, where e.g. the quality of one of the serial "channels" has a maximum possible data rate lower than others, a higher data rate may be obtained by not "locking" the data rates of the paths but allowing the other data rates to be higher than that possible by the "lower quality" data path.

Yet another aspect relates to a method of operating the interface according to the fifth or sixth aspects, the method comprising: altering between two modes of operation wherein:
  in a first mode of operation, the deserializing means receive data independently of each other and output the parallel data independently of each other, and
  in a second mode of operation, the single parallel data is output.

The invention also relates to a method of operating the interface according to the third or fourth aspects, the method comprising: altering between two modes of operation wherein:
  in a first mode of operation, the serializing means receive the first parallel data independently of each other and output the serial data independently of each other, and
  in a second mode of operation, the plurality of serial data signals output have the predetermined timing relationship.

An important aspect of the invention relates to a switch having:
  a number of devices each comprising an interface according to the third or fourth aspect and an interface according to the fifth or sixth aspect and each being adapted to receive a plurality of serial data signals from and output a plurality of serial data signals to one or more network connections,
  a data bus on which the devices are adapted to interchange data, wherein at least one of the devices is adapted to alter between operation in one of at least two modes of operation comprising:
  a first mode of operation wherein the device is adapted to receive serial data signals from and transmit serial data signals to a first number of network connections via the interface, and
  a second mode of operation wherein the device is adapted to receive serial data signals from and transmit serial data signals to a second number of network connections via the interface, the second number being higher than the first number.

In the present context, a "network connection" would be a connection for data communication to one or more computers or computer networks, such as the WWW or Internet, a single computer, and everything there between.

Preferably, the at least one device comprises a processing means adapted to process the data received from the interface before transmission to the data bus, the processing means being adapted to alter between operation in one of at least two modes of operation comprising:
  a first mode of operation wherein the means is adapted to process the data from each of the first number of network connections independently of each other, and
  a second mode of operation wherein the means is adapted to process the data from the second number of network connections independently of each other.

This processing of the data will depend on the actual use of the switch. A processing may be the checking for errors, performing standardization or normalization of the data, determining where the data is to be transmitted to (such as using a look-up table) or from where it comes, what type of data it is, and what priority it has. Other processing is alteration of the data, such as converting an encapsulation of the packet, removing, adding or replacing parts of the data, and correcting e.g. errors in the data.

In this situation, the processing means may comprise, in the second mode of operation, separate memory for each of the second number of independent processes and logic shared between the second number of independent processes. Thus, a saving in logic may be obtained. This may be obtained by either synthesizing VHDL code from all processing processes into a single block in e.g. a chip Thus, also through the processing means, the data to or from the paths of the interface may be treated independently of each other.

Preferably, the processing means comprises, in the second mode of operation, separate memory for each of the second number of independent processes and logic shared between the second number of independent processes.

Also, the at least one device preferably further comprises a storage means adapted to store data between receipt thereof at the interface and transmission thereof on the bus, the storage means being adapted to alter between operation in one of at least two modes of operation comprising:
  a first mode of operation for use when the device operates in its first mode of operation and wherein the storage means is adapted to store received data in a number of queues corresponding to the first number of network connections times a first predetermined number, and
  a second mode of operation for use when the device operates in its second mode of operation and wherein the storage means is adapted to store received data in a number of queues corresponding to the second number of network connections times a second predetermined number.

The first and second predetermined numbers can differ from one when it is desired to be able to store data in a queue relating to e.g. a priority thereof. Thus, the predetermined number may relate to the number of priorities.

Another aspect of the invention relates to a method of operating a switch having:
  a number of devices each comprising an interface according to the third or fourth aspect and an interface according to the fifth or sixth aspects and each being adapted to receive a plurality serial data signals from and output serial data signals to one or more network connections via the interface,
  a data bus on which the devices are adapted to interchange data, the method comprising altering, in at least one of the devices, between at least two modes of operation comprising:

a first mode of operation wherein the device receives serial data signals from and/or transmits serial data signals to a first number of network connections via the interface, and a second mode of operation wherein the device receives serial data signals from and/or transmits serial data signals to a second number of network connections via the interface, the second number being higher than the first number.

The method preferably also comprises the step of processing the data received from the interface before transmission to the data bus, the method comprising altering the processing between at least two modes of operation comprising:

a first mode of operation wherein the data from each of the first number of network connections is processed independently of each other, and a second mode of operation wherein the data from the second number of network connections is processed independently of each other.

In addition, a step may be added for storing data between receipt thereof at the interface and transmission thereof on the bus, the method comprising altering the storing between at least two modes of operation comprising:

a first mode of operation for use when the device operates in its first mode of operation and wherein data is stored in a number of queues corresponding to the first number of network connections times a first predetermined number, and a second mode of operation for use when the device operates in its second mode of operation and wherein received data is stored in a number of queues corresponding to the second number of network connections paths times a second predetermined number.

A final aspect of the invention relates to a method of operating the above switch, the method comprising:

determining, for at least one of the devices, whether to use the first or the second mode of operation, and operating the device in the mode of operation determined.

The present interface may be an interface between different parts of an electronic circuit or of a communication system. Thus, the interface may comprise pins, balls, or pads of a chip, where the aligning and operating means could then form part of the chip. In that situation, the interface could define the communication into and out of the chip. In this particular situation, the interface of the chip may define, using the same pads/pins/balls, both a wider interface and a number of more narrow interfaces—and where the interfaces may be run with different frequencies. This will reduce the pin/ball/pad count of the chip. In that situation, the parallel data and the parallel data busses may be internal to the chip.

Naturally, the interface may also interconnect with the networks, chips, computers or the like using connectors or plugs—or via soldering.

Even though it is presently preferred that the first mode of operation merely receives/transmits a single piece of or stream of data in the first mode of operation, any number of parallel transmissions/receptions may be used. The overall invention relates to the use of the same interface for two different numbers of data streams or pieces—preferably transmitted at two different overall data rates. The actual choice may relate to the overlap in connectors between the individual sub-interfaces.

BRIEF DESCRIPTION OF THE INVENTION

Figure 2:
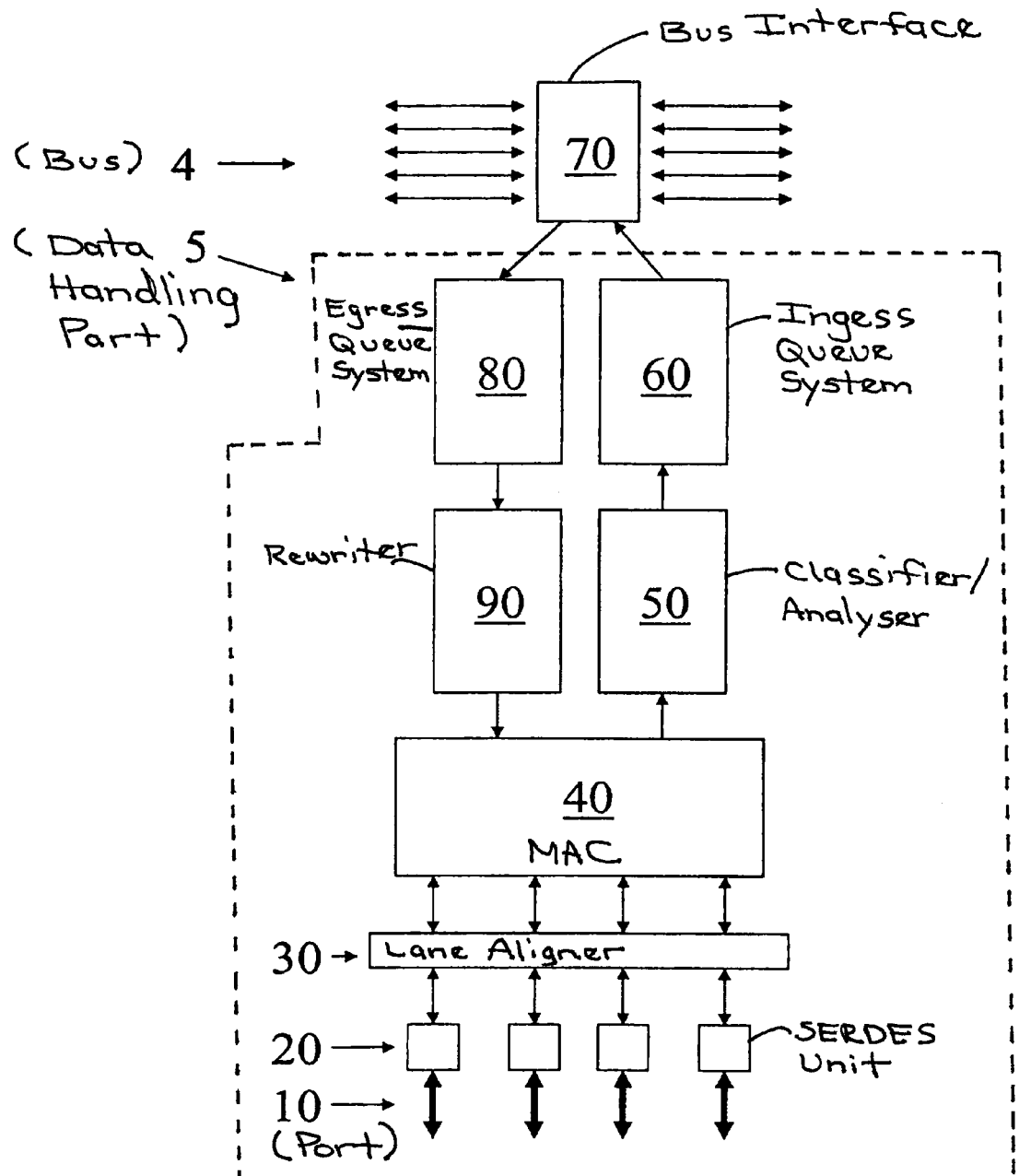
Figure 3:
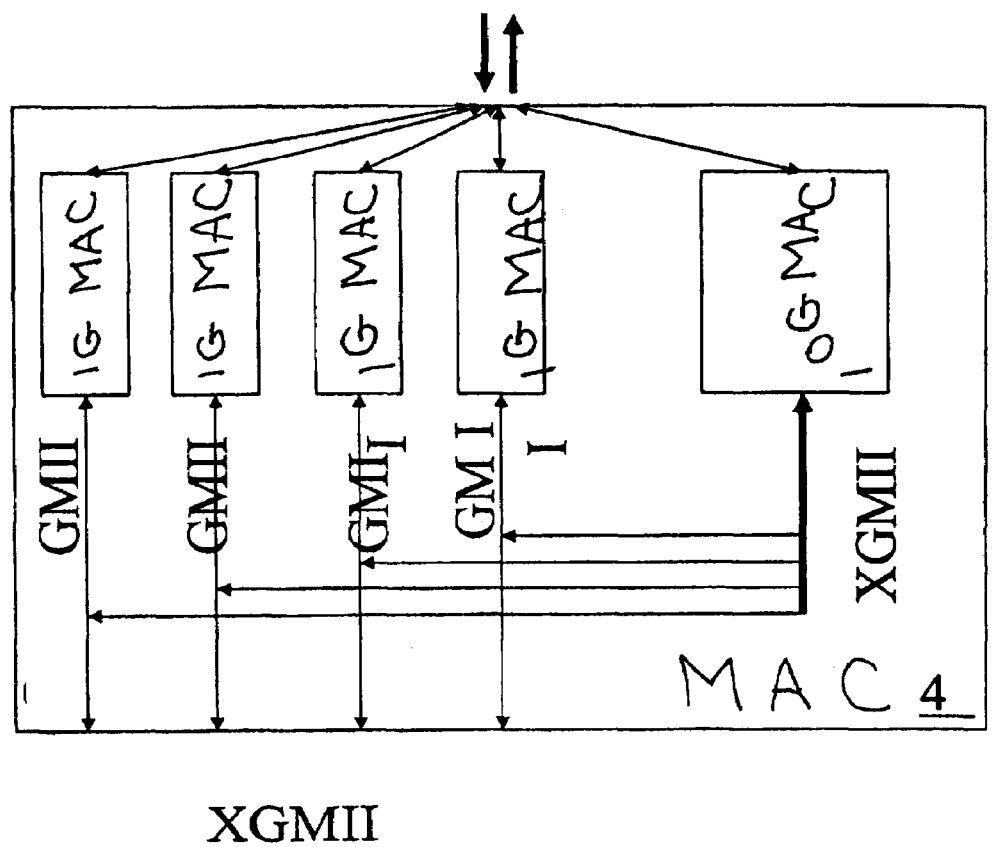
Figure 4:
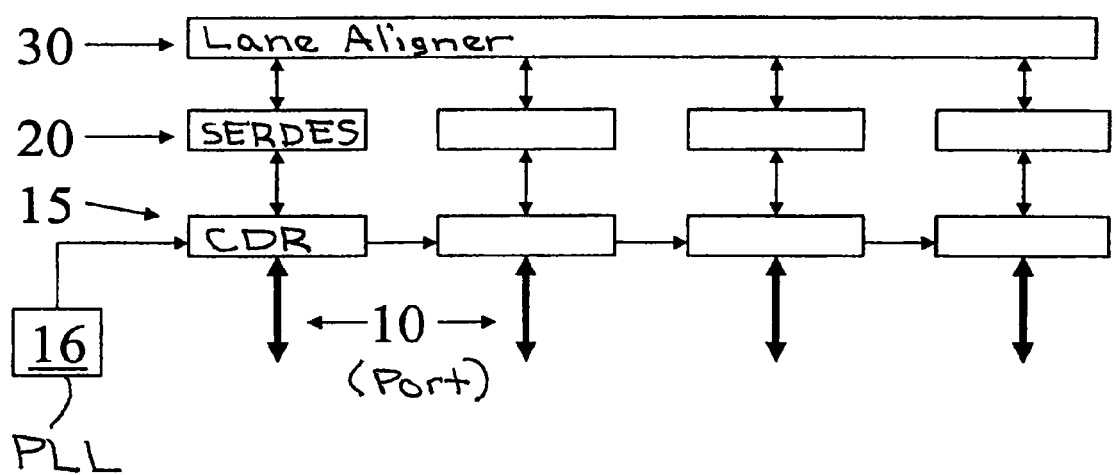
Figure 5:
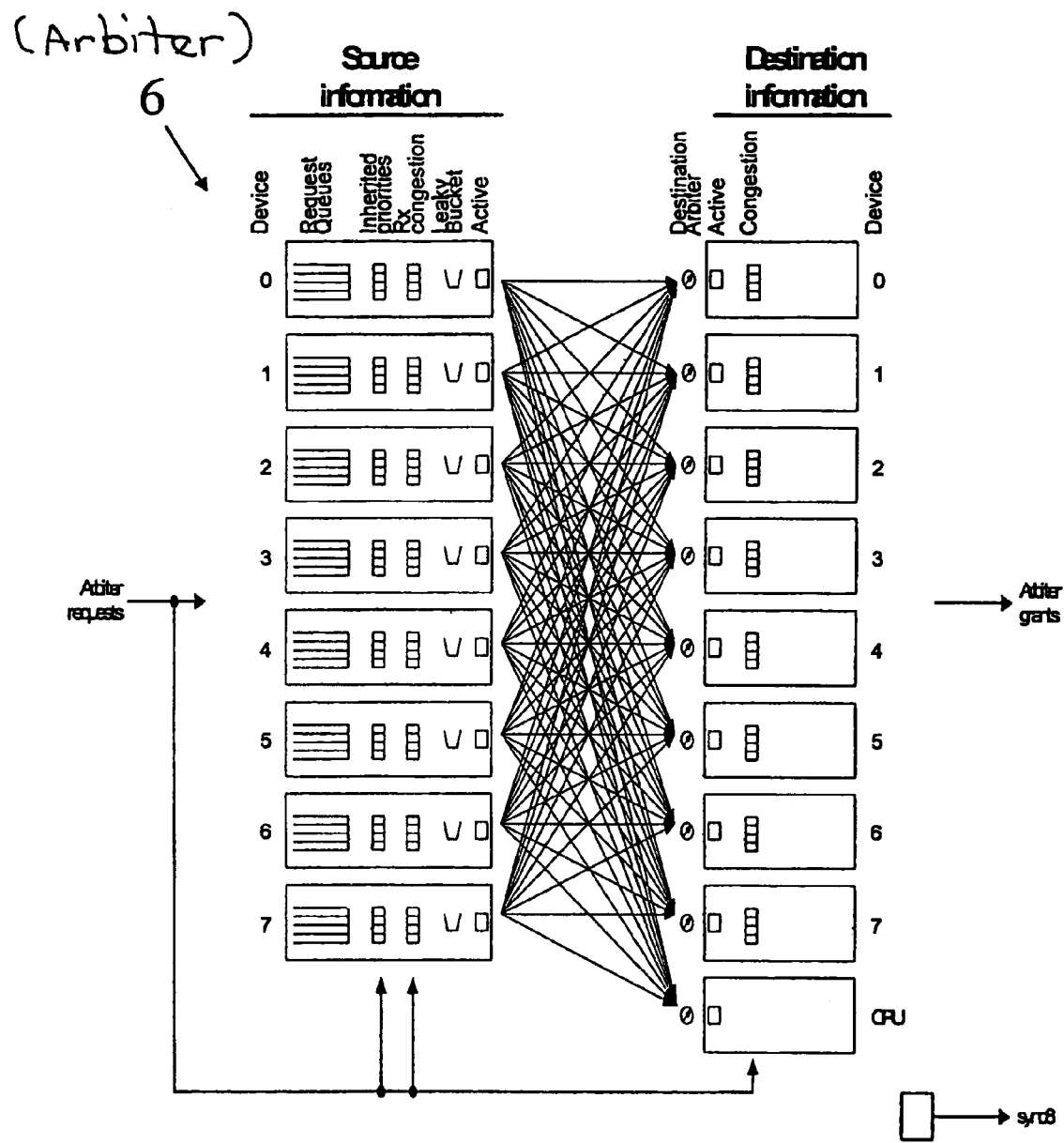
Figure 6:
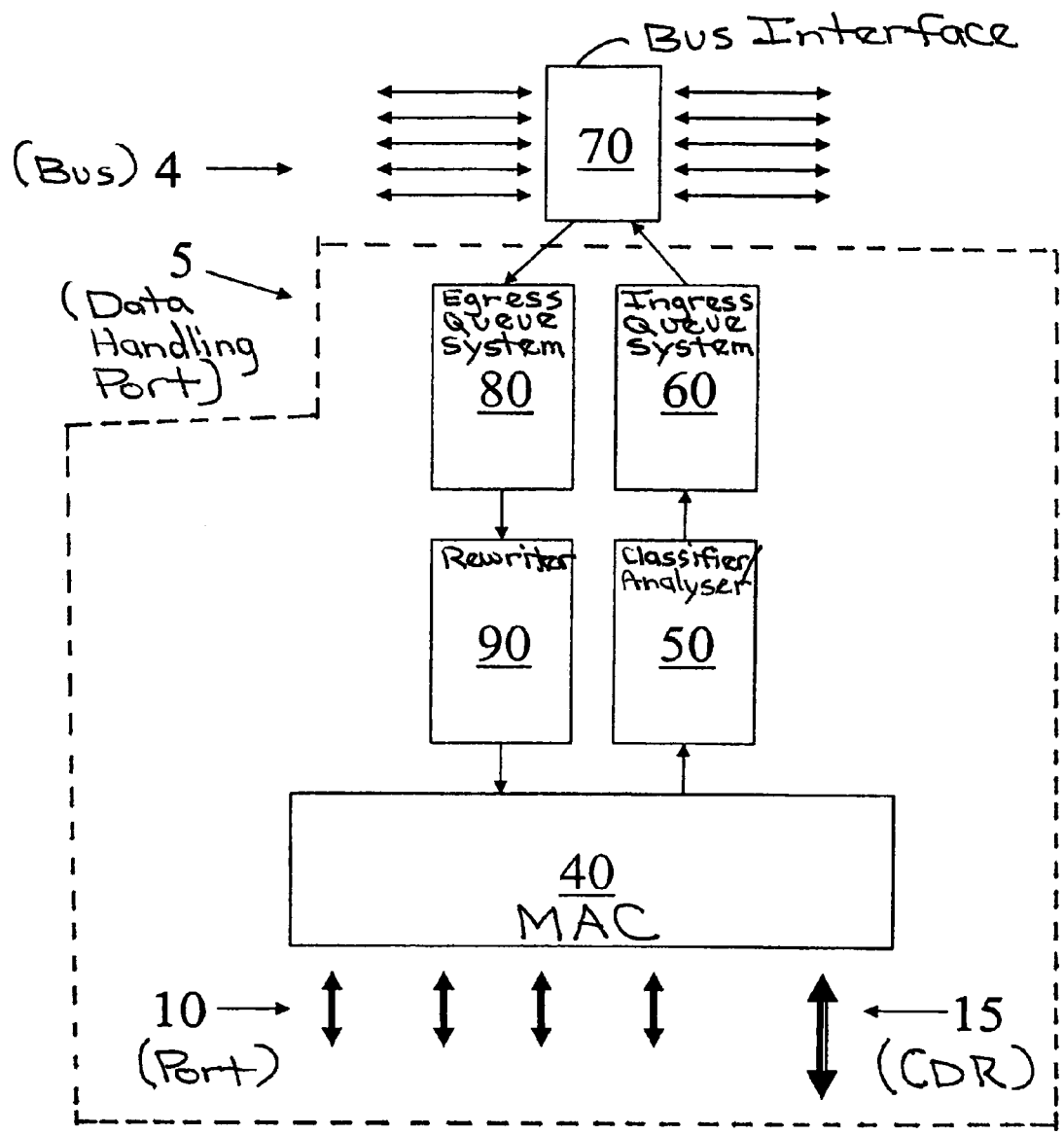

In the following, two embodiments will be described with reference to the drawing, wherein:

FIG. 1 illustrates the overall preferred embodiment of the invention as a box diagram, FIG. 2 illustrates a box diagram of the most important parts of the preferred embodiment of FIG. 1, FIG. 3 is a more detailed illustration of a combined MAC of FIG. 2, FIG. 4 is a more detailed illustration of part of FIG. 2, FIG. 5 is an illustration of the arbiter of the preferred embodiment, and FIG. 6 is an alternative embodiment to that of FIG. 2.

DETAILED DESCRIPTION

FIG. 1 illustrates the preferred, overall system, which is an Ethernet switch having a plurality of combined devices/ports communicating via a ring-shaped bus 4, where one device has a bus interface 70 and a data handling part 5 and a combined port designated by four fat double arrows 10.

The switch acts by receiving Ethernet packets at the ports, performing a processing thereof (to be explained later) and forwarding the packets (as fixed-size cells) on the bus 4 via bus interfaces 70 to another combined port which performs additional processing on the packet and outputs it.

The functionality of all devices of the switch being the same in this embodiment.

The overall functionality of the present bus and devices may be seen from U.S. application Ser. No. 09/965,127 filed on Sep. 28, 2001, which is hereby incorporated by reference. The major difference is the higher bandwidth of the present data bus and the fact that only 8 devices are on the ring bus in the present application where 16 are present in the application.

Thus, each device is able to send and receive data at the same rate over the data bus. However, the present invention relates to an aspect where different devices may have different port "configurations" with different data rates. In this manner, altering the overall bandwidth on the bus may not require a change in the structure of the communication on the bus—while still resulting in an increase in bandwidth and data rate of the ports. This also avoids the problem of a lower data rate device transmitting to a higher data rate device and then reducing the capability of the higher data rate device. The reverse situation is equally problematic.

The arbiter of the switch (FIG. 5) will receive transmission requests from the devices and determine in which order the individual devices can transmit their data. This arbiter arbitrates between the individual ports of the individual devices.

When the arbiter issues a transmission acknowledgement to a device, the device will transmit the data packet—as a number of fixed-size cells. In this acknowledgement, information may be introduced as to which port(s) on the receiving device the packet is to be output. The receiving device has means for receiving this information and forwarding the cells/packet to the correct output queue. See further below.

To be more specific, see FIG. 2 but skipping for the moment the lower part of FIG. 2, an Ethernet packet is received at a port 10 and forwarded to a MAC 40 which performs the standard MAC processing thereof and forwards the packet to a classifier/analyser 50 for classification and analysis (deriving a priority for the packet and determining which other device to transmit the packet to via the bus).

Naturally, this classifier/analyser 50 may be shared (or part thereof may be shared) between multiple or all devices in the switch.

In the preferred embodiment, the classifier is provided in the individual device but the analyser is shared between all devices in the switch (See FIG. 1: No. 7). Headers of the packets are transmitted from the devices to the analyser, which will then perform a centralized look-up and return an ID of the receiving device.

After analysis/classification, the packet is stored in an ingress queue system 60 prior to transmission on the bus via a bus interface 70. Preferably, the packet is divided into fixed-size cells prior to transmission.

The bus interface 70 on the receiving device will receive the cells and transfer these to an egress queue system 80 and further to a rewriter 90, which may perform amendments to the final packet before transmission to the MAC 40 for outputting.

It should be noted that it may be desired to provide additional formatting, such as the 8 b/10 b encoding, of the signal between the MAC 40 and the lane alignment, and that the individual encoders may communicate in order to encode the 32 bit XGMII word in the 10 G case.

The above typical functionality of a switch is enhanced in the present embodiment in that the device is software configurable between two modes:
  a first mode where the device acts as a single 10 Gbit/s I/O port of the switch and
  a second mode where the device acts as four 1 Gbit/s I/O ports of the switch.

This, naturally, requires amendments of the individual elements in order to obtain this functionality.

As to the MAC 40, a more detailed view thereof may be seen from FIG. 3, where it is seen that, in fact, 5 MACs are at least functionally present. Four 1 Gbit/s MACs and one 10 Gbit/s MAC. The 1 Gbit/s MACs communicate using the GMII 1 Gbit/s standard to a lane aligner 30, the functionality of which will be described later. The 10 Gbit/s MAC communicates using the XGMII 10 Gbit/s standard.

The MACs may 1) be fully separate units in the system and on a chip defining the device. Alternatively, they may 2) be combined by combining the four 1 Gbit/s MACs and leaving the 10 Gbit/s MAC as a separate part. Also, the five MACs may 3) be fully separated into a single block on the chip. In this situation, combination would mean that the logics/storage thereof are either combined or in some situations actually shared between combined MACs These solutions have the following advantages/disadvantages:

1): A single block has to be defined. However, all MACs (that is, all 4 1 Gbit/s MACs operated at the same time) operated must be in the same clock domain and be synchronized. This may be a problem when each MAC feeds an OE to an optical fibre. Also, an overall block size reduction will be obtained in that the synthesized block will reuse logic across the MACs, whereby the overall size of the block will be smaller than the combined size of individual blocks.

2): The above synchronization disadvantage is seen—and two blocks now have to be defined. Again, a certain reduction in size and logics will be seen.

3): The synchronization disadvantage is removed but now 5 individual blocks have to be defined. Also, the size of the MACs on the chip will be the largest.

In fact, yet another solution may be used: providing a MAC (for the 1 Gbit/s MACs), which is able to perform the operation of the four 1 Gbit/s MACs by time multiplexing. In that situation, compared to four individual 1 Gbit/s MACs, the same logic may be used and only the storage for holding the states of the individual time multiplexed MACs needs be provided in four copies.

As to the analyser/categorizer 50, a number of manners exist as to how to provide that unit with the present multi-functionality. It will be possible to provide storage adapted to hold packets received from the MAC(s) 40 and to operate on each packet on a serial basis. In that situation, the analyser/categorizer must simply be able to handle a packet rate of 10 Gbit/s.

If it is not desired to provide this much storage at this position in the system, the categorizer/analyser 50 may be run as four separate (in the 4×1 Gbit/s mode) analysers/categorizers which may, just as the MACs, be synthesized into a single block having four state memories but combined logic.

The preferred embodiment is adapted to handle a number of priorities and to store the packets/cells in the ingress queue system 60 in prioritized queues. Thus, the queue system 60 is already able to handle a plurality of queues, and the shift from the 1×10 Gbit/s mode and the 4×1 Gbit/s mode will simply entail a change in the number of queues. This alteration is quite simple.

The same is the case for the egress queue system 80.

The rewriter 90 may be altered or prepared in the same manner as the MAC 40 and the analyzer/categorizer 50.

So, now to the lower part of FIG. 2 (see also FIG. 4).

It is clear from FIG. 3 that the MAC(s) output either four GMII signals or one XGMII signal. These signals are to be formatted and output from the system.

The basic idea is the following observation:
  XAUI is based on 4 (synchronized) 3.125 GHz PECL channels.
  Quad SGMII uses 4 (unsynchronized) 1.25 GHz PECL channels.
  Also, 1 GbE serdes is based on a 1.25 GHz LVDS channel, which is potentially related to tri-speed SGMII.

Thus, it will be possible to share the same set of pins between a single XAUI port and four (e.g. tri-speed) 1 GbE ports.

Thus, the 1 G/10 G signals are output on a port adapted to output XAUI when all four I/O's are used or as 4×1 Gbit/s SGMII/SERDES when used individually.

XAUI requires that the four lanes be aligned. A time skewing may take place between the signals either in the transport medium (copper cables or optical cables) or even between the 10 Gbit/s MAC and the XAUI port. Therefore, for use in the 10 Gbit/s mode, a Lane alignment 30 is provided for performing this alignment—preferably both in the RX mode and the TX mode.

The XGMII/GMII signals output from the MAC(s) are parallel signals which need to be serialized both for use in XAUI and SERDES/SGMII. For that use, four SERDES units 20 are provided.

An important aspect of this part of the system is the fact that both 1 Gbit/s operation and 10 Gbit/s operation may be obtained using the same SERDES circuits, which are quite complex circuits.

In the 10 Gbit/s mode, the lane alignment 30 will ensure line alignment of the XAUI signals received or the XGMII signals to be transmitted (as XAUI signals). In the 1 Gbit/s mode, the lane alignment is not used.

For use in most of the modes, a Clock Data Recovery CDR 15 is provided for each lane. This circuit derives the clock embedded in the XAUI/SERDES/SGMII signals.

The CDRs 15 will be fed by a PLL 16, which is able to provide the 1.25 GHz, 2.5 GHz, and 3.125 GHz signals used in SERDES/SGMII, Infiniband, and XAUI, respectively. This span could be reduced by using a 1:2 prescaler in the 1 GbE case.

The Infiniband communication may also be used in the present system in that it is quite similar to XAUI.

In certain embodiments of SGMII, a separate clocking signal may be provided on the link, and it may be desirable that the present system outputs the derived clocking signal from the link in order to also be useful in systems expecting this signal.

The Serdes circuits are standard Serdes circuits, and the CDR will only be required in the SGMII case where a clock is embedded in the signal.

A concern could be power: As the high-speed logic is made for 3.125 GHz, it could burn excessive power at 1.25 GHz. This can be fixed, however, by adjusting the bias current provided to the high-speed logic so that the chip or at least the relevant parts thereof are adapted to operate at two bias currents.

It should be noted that a likely development in the market is a quad SGMII copper PHY, with a single clock towards the MAC (paralleling similar developments at lower speeds); in this case, the CDR blocks can be simplified considerably.

The arbiter described in the above patent application is quite suitable for use in the present embodiment in that the internal arbitration in the individual device will, together with the arbiter's inter-device arbitration perform the required task.

However, a number of other features in addition to the coarse arbitration are desired in this type of product. Therefore, a preferred arbitration is illustrated in FIG. 5.

The overall arbitration performed is one where an arbitration decision should be made for each device each 8'th clock cycle when there are 8 devices on the ring.

This arbitration is performed by finding the best set of transmitter-receiver pairs on the basis of the requests received. Naturally, the priority of the data packets requested transmitted is taken into account. These pairs are pairs of I/O ports—where only a single port of each device can transmit at the same time and only a single port of each device can receive at the same time.

Each port of a device has its own scheduling queue in the arbiter. It is seen that each of the 8 devices (devices 0-7) can communicate with each of those devices and a CPU.

Each of the devices has four queues for transmission requests—one for each queue. If a device has only a single port, these four queues may be reduced to a single one (or the other three may simply not be used).

A problem encountered in arbitration is that of Head Of Line blocking where a lower priority data packet blocks a higher priority packet by not being transmitted. This problem is solved by inheriting priority so that, for a given packet, all packets in front thereof in the queue have the same or a higher priority. If a higher priority packet is queued behind lower priority packets, the lower priority packets inherit the higher priority in order to be transmitted quickly so that the real higher priority packet may be transmitted.

Thus, together with an arbiter request (or without—if the arbiter queue for the particular device is full), a highest priority of all packets in the queues of the device is forwarded to the arbiter in order to have priority inheritance.

An alternative to this would be to allow the packets to change places in the queue. This is not desired in the present embodiment in that this changing of places will also have to be reported to the individual device.

Another thing to take into account when arbitrating between two sources desiring to transmit data packets to the same destination is the amount of data transmitted by the sources. Therefore, bucket levels are maintained for all source devices.

For each port in each device, the arbiter 6 maintains information about its state as a source and as a destination. The CPU device only has destination information. The arbitration is based on this information.

The arbiter issues cell bus access grants based on arbiter requests from the individual ports. For each device, the arbiter first performs a "local" arbitration determining, for each port, whether the port wishes to transmit data and whether the desired receiver port is available (and performing a Round Robin if more candidates exist also having the same priority). Thus, one request is found for each device. Arbitration is then performed between the devices as described further below. The arbiter also generates a synchronization signal, which all devices synchronize to.

Source Information:
Request queues. Each contains up to 4 arbiter requests. For multicast packets, a request stays in the queue until all destination ports have received the frame, which may take several frame transfers.

Leaky bucket level per device. Programmable leaky bucket. Leak rate can be set within the range from 0.9375 Gbit/s to 60 Gbit/s by programming the number of four bus_clks between decrements, for example, a value of 2 results in a leak rate of 30 Gbit/s. Bucket size is 255 cells (255 cells corresponds to around 23 Kbytes). The leaky bucket must be saturating.

Inherited priority per queue. The highest priority among frames waiting, that is, among frames for which arbiter requests are stored in the request queue and frames in the device's RX queue system for which arbiter requests have not yet been made.

Active. Indicates whether a device is currently transmitting, that is, whether it has started transfer of a frame and not yet transferred the last cell.

Destination Information:
Active. Indicates whether a frame transfer is currently in progress to the device.

Congested per port. Indicates that a port is in congestion. Note that the CPU device cannot indicate congestion and must discard frames locally as necessary.

The arbiter is capable of generating a grant for all eight (source) devices every eight bus_clk cycles. For an active source (port and device), the arbiter must send out the same grant every eight cycles. The only exception is if one or more of the destination devices/ports experiences congestion, in which case grants are held back until congestion has cleared up in all devices that are acting as destinations in the current transfer.

A destination port/device becomes inactive when the grant that causes transfer of the last cell of a frame is issued. Every time a destination device is inactive a new arbitration decision is made. The result may be that a new frame transfer to the destination is started or that the destination stays inactive. When making an arbitration decision, only inactive sources can be taken into consideration and, obviously, only sources that have a pending request for transfer to that particular destination are considered. Among those, the sources with highest inherited priority are candidates. If more candidates are available, the candidates with lowest leaky bucket level are selected. If there is still more than one candidate, a round-robin arbitration takes effect.

The state of the round-robin arbiter is only updated when it takes effect. The round-robin arbiter functions as a priority encoder with moving lowest priority point. When round-robin arbitration takes effect, the lowest priority point moves to the device that was just selected, putting it at the bottom of the priority list for next time the arbitration takes affect.

The same arbitration decision may be made for more destinations at the same time, that is, within the same eight-cycle period, which will result in multiple destinations for all cells in the next frame transfer from the selected source.

In summary, when making an arbitration decision for a destination the steps necessary for identifying a single source are performed from the list below, starting from the top:
1. Find inactive sources
2. Find sources with frame data for the destination
3. Find sources with highest inherited priority
4. Find sources with lowest leaky bucket level
5. Use round-robin arbitration For each transfer, the set of destination devices/ports in the request is reduced until it is empty. At that point the request is removed from the queue.

It is possible to disable a source. When a source is disabled, requests from that source are ignored and grants are only issued for requests already in the request queue.

The above, preferred embodiment provides a choice between a single 10 Gbit/s connection and four 1 Gbit/s connections. The reason for this particular choice is the fact that the same interface may support either one XAUI (10 G) interface or four SERDES (1 G) interfaces. Clearly, the four 1 G ports are not able to communicate at the 10 G rate, but the bus interface and queue system are able to receive bursts of 10 G (or, in fact, a higher rate due to a speed-up factor on the bus in order to avoid congestion). If the queue system gets congested, flow control is used for then stopping the transmitting device.

However, a switch may be made not providing a choice like that but where the backbone (bus and overall structure) is able to provide a data rate not corresponding to any of the standard data rates, such as 14 Gbit/s. In that situation, a combination of ports may be selected for each device so that this bandwidth is fully utilized.

A switch of that type may be seen from FIG. 6, wherein the MAC 40 has been amended to now handle both 4 1 Gbit/s and one 10 Gbit/s ports. In this manner, the elements 40, 50, 60, 70, 80, and 90 should be able to handle not 10 Gbit/s but 14 Gbit/s. Alternatively, up to 14 1 Gbit/s ports could be provided Thus, again, the devices may have different numbers and rates of ports, while the devices are not slowed when communicating.

In the present embodiments, and also as described in the above-mentioned application, each device is adapted to receive and transmit data with a predetermined data rate. Thus, data packets are received and stored for transmission at that rate and stored with that rate for transmission from the device at any desired rate.

Thus, there seems to be no need for allowing a number of devices to transmit data to the same destination at the same time. However, this may be facilitated rather simply in that the queue system of the receiving device already has a number of queues to receive multiple data packets. In addition, if the data packets are for different ports in the device, different ports preferably have different queues. Thus, it is quite possible to have multiple sources transmit data to one and the same destination device.

The invention claimed is:

1. A means for switching data, the means comprising:
    a data bus,
    a plurality of devices configured to exchange data with each other via the data bus, each device being configured to receive data from and transmit data to at least one corresponding I/O port, at least one first device being configured to receive data from and transmit data to a plurality of corresponding I/O ports,
    arbiter means for determining an order of exchanging, on the data bus, of data between the devices,
    the devices being configured to:
        receive and store data from a corresponding I/O port, transmit, to the arbiter, information relating to congestion or availability of a corresponding port,
        receive, from the arbiter, information indicating whether the received data may be transmitted over the data bus,
        transmit, if the information received indicates that the data may be transmitted, the data over the data bus, and
        receive data from the data bus and forward the received data to a corresponding I/O port,
    the arbiter being configured to:
        receive, from the devices, the congestion or non-availability information, and
        determine the order of exchanging data on the basis of the congestion information;
    wherein a device is configured to determine congestion at a corresponding I/O port and to transmit corresponding information to the arbiter, and wherein the arbiter is configured to override any congestion or non-availability of a receiving device or I/O port when a congested I/O port wishes to transmit data thereto, and inform the pertaining device that the congested I/O port is allowed to transmit data.

2. A means according to claim 1, wherein a plurality of the devices are configured to exchange data with each other directly over the data bus at at least substantially the same rate.

3. A means according to claim 1, wherein the arbiter is configured to receive information relating to each piece of data received at the I/O ports, the information comprising an I/O port and/or a device to receive the piece of data.

4. A means according to claim 1, wherein the arbiter is configured to provide, to the at least one first device, information relating to which of the corresponding ports is allowed to transmit data.

5. A means according to claim 1, wherein the at least one first device is configured to determine to which of its corresponding I/O ports to transmit data received from the data bus.

6. A means according to claim 1, wherein each device is configured to transmit all pieces of data received at the corresponding I/O ports to the data bus.

7. A means according to claim 1, wherein at least one third device further comprises a processing means configured to:
    provide a priority for each piece of data received at its I/O port(s),
    divide each piece of data received at its I/O port(s) into cells before transmission thereof to the data bus and to assemble cells received from the data bus into pieces of data before outputting from an I/O port, process each piece of data received at an I/O port, and/or derive, from each piece of data received at an I/O port, information for transmission to the arbiter.

8. A means according to claim 7, wherein the device comprises a processing means for each I/O port of the device.

9. A means according to claim 7, wherein the at least one third device has means for providing a priority for each piece of data received at its corresponding I/O port(s), and wherein the arbiter is configured to determine the order of exchanging data also on the basis of the priority of the data.

10. A means according to claim 1, further comprising a Look-Up Engine configured to receive information relating to each piece of data received at an I/O port and to derive, from the information, identifying information relating to one or more I/O port(s) or device(s) to receive the piece of data.

11. A means according to claim 10, wherein each device is further configured to derive, from each piece of data received, information relating to the piece of data, to transmit the information to the Look-Up Engine, receive identifying information from the LU Engine, and to exchange the identifying information on the data bus together with the piece of data.

12. A means according to claim 10, wherein the data and identifying information is stored subsequent to receipt of the identifying information and prior to exchange thereof on the data bus.

13. A means according to claim 10, wherein at least one fourth device is configured to, on the basis of the identifying information, determine whether the data is addressed for the device or not.

14. A means for switching data, the means comprising:
a data bus,
a plurality of devices configured to exchange data with each other via the data bus, each device being configured to receive data from and transmit data to at least one corresponding I/O port, at least one first device being configured to receive data from and transmit data to a plurality of corresponding I/O ports,
arbiter means for determining an order of exchanging, on the data bus, of data between the devices,
the devices being configured to:
  receive and store data from a corresponding I/O port,
  transmit, to the arbiter, information relating to congestion or availability of a corresponding port,
  receive, from the arbiter, information indicating whether the received data may be transmitted over the data bus,
  transmit, if the information received indicates that the data may be transmitted, the data over the data bus, and
  receive data from the data bus and forward the received data to a corresponding I/O port,
the arbiter being configured to:
  receive, from the devices, the congestion or non-availability information, and
  determine the order of exchanging data on the basis of the congestion information;
wherein the arbiter is configured to provide, to the at least one first device, information relating to which of the corresponding ports is allowed to transmit data; and
wherein the arbiter is configured to examine, for the at least one first device, whether a first port of the plurality of ports wishes to transmit data to a congested or non-available port and to, if so, examine whether another port of the plurality of ports wishes to transmit data to a non-congested or available port and, if so, transmit, to the at least one first device, information relating to the other port being allowed to transmit data.

15. A means for switching data, the means comprising:
a data bus,
a plurality of devices configured to exchange data with each other via the data bus, each device being configured to receive data from and transmit data to at least one corresponding I/O port, at least one first device being configured to receive data from and transmit data to a plurality of corresponding I/O ports,
arbiter means for determining an order of exchanging, on the data bus, of data between the devices,
the devices being configured to:
  receive and store data from a corresponding I/O port,
  transmit, to the arbiter, information relating to congestion or availability of a corresponding port,
  receive, from the arbiter, information indicating whether the received data may be transmitted over the data bus,
  transmit, if the information received indicates that the data may be transmitted, the data over the data bus, and
  receive data from the data bus and forward the received data to a corresponding I/O port,
the arbiter being configured to:
  receive, from the devices, the congestion or non-availability information, and
determine the order of exchanging data on the basis of the congestion information;
a Look-Up Engine configured to receive information relating to each piece of data received at an I/O port and to derive, from the information, identifying information relating to one or more I/O port(s) or device(s) to receive the piece of data; and
wherein the arbiter is configured to, when more than one port or device is to receive a piece of data received at a receiving device, determine which of the ports and devices are available or non-congested and transmit information to the receiving device in order to have it forward the data to those ports and devices, and subsequently, when other of the ports or devices are available or non-congested, inform the receiving device to forward the data to those devices or ports.

16. A method of switching data in a switching means comprising:
a data bus,
a plurality of devices configured to exchange data with each other via the data bus, each device being configured to receive data from and transmit data to at least one corresponding I/O port, at least one first device being configured to receive data from and transmit data to a plurality of corresponding I/O ports, and
arbiter means for determining an order of exchanging, on the data bus, of data between the devices,
the method comprising the each device:
  receiving and storing data from a corresponding I/O port,
  transmitting, to the arbiter, information relating to congestion or availability of a corresponding port,
  receiving, from the arbiter, information indicating whether the received data may be transmitted over the data bus,
  transmitting, if the information received indicates that the data may be transmitted, the data over the data bus, and
  receiving data from the data bus and forward the received data to a corresponding I/O port, and the arbiter:
  receiving, from the devices, the congestion or non-availability information, and
  determining the order of exchanging data on the basis of the congestion information;
wherein a device determines congestion at a corresponding I/O port and transmits corresponding information to the arbiter, and wherein the arbiter overrides any congestion or non-availability of a receiving device or I/O port when a congested I/O port wishes to transmit data thereto, and informs the pertaining device that the congested I/O port is allowed to transmit data.

17. A method according to claim 16, wherein a plurality of the devices exchange data with each other directly over the data bus at at least substantially the same rate.

18. A method according to claim 16, wherein the arbiter receives information relating to each piece of data received at the I/O ports, the information comprising an I/O port and/or a device to receive the piece of data.

19. A method according to claim 16, wherein the arbiter provides, to the at least one first device, information relating to which of the corresponding ports is allowed to transmit data.

20. A method according to claim 16, wherein the at least one first device determines to which of its corresponding I/O ports to transmit data received from the data bus.

21. A method according to claim 16, wherein each device transmits all pieces of data received at the corresponding I/O ports to the data bus.

22. A method according to claim 16, wherein at least one third device further comprises one or more of the processing steps of:
  providing a priority for each packet or frame received at its I/O port(s),
  dividing each packet or frame received at its I/O port(s) into cells before transmission thereof to the data bus and assembling cells received from the data bus into frames or packets before outputting from an I/O port,
  processing each packet or frame received at an I/O port, and
  deriving, from each packet or frame received at an I/O port, information for transmission to the arbiter.

23. A method according to claim 22, wherein the at least one third device performs one or more processing steps for each I/O port of the device.

24. A method according to claim 22, wherein the at least one third device performs the step of providing a priority for each piece of data received at its corresponding I/O port(s), and wherein the arbiter determines the order of exchanging data also on the basis of the priority of the data.

25. A method according to claim 16, further comprising the step of a Look-Up Engine receiving information relating to each piece of data received at an I/O port and deriving, from the information, identifying information relating to one or more I/O port(s) or device(s) to receive the piece of data.

26. A method according to claim 25, wherein each device further derives, from each piece of data received, information relating to the piece of data, transmits the information to the LU Engine, receives identifying information from the Look-Up Engine, and exchanges the identifying information on the data bus together with the piece of data.

27. A method according to claim 25, wherein the data and identifying information is stored subsequent to receipt of the identifying information and prior to exchange thereof on the data bus.

28. A method according to claim 25, wherein at least one fourth device determines, on the basis of the identifying information, whether the data is addressed for the device or not.

29. A method of switching data in a switching means comprising:
  a data bus,
  a plurality of devices configured to exchange data with each other via the data bus, each device being configured to receive data from and transmit data to at least one corresponding I/O port, at least one first device being configured to receive data from and transmit data to a plurality of corresponding I/O ports, and
  arbiter means for determining an order of exchanging, on the data bus, of data between the devices,
  the method comprising the each device:
    receiving and storing data from a corresponding I/O port,
    transmitting, to the arbiter, information relating to congestion or availability of a corresponding port,
    receiving, from the arbiter, information indicating whether the received data may be transmitted over the data bus,
    transmitting, if the information received indicates that the data may be transmitted, the data over the data bus, and
    receiving data from the data bus and forward the received data to a corresponding I/O port,
  and the arbiter:
    receiving, from the devices, the congestion or non-availability information, and
    determining the order of exchanging data on the basis of the congestion information;
  wherein the arbiter provides, to the at least one first device, information relating to which of the corresponding ports is allowed to transmit data; and
  wherein the arbiter examines, for the at least one first device, whether a first port of the plurality of ports wishes to transmit data to a congested or non-available port and to, if so, examines whether another port of the plurality of ports wishes to transmit data to a non-congested or available port and, if so, transmits, to the at least one first device, information relating to the other port being allowed to transmit data.

30. A method of switching data in a switching means comprising:
  a data bus,
  a plurality of devices configured to exchange data with each other via the data bus, each device being configured to receive data from and transmit data to at least one corresponding I/O port, at least one first device being configured to receive data from and transmit data to a plurality of corresponding I/O ports, and
  arbiter means for determining an order of exchanging, on the data bus, of data between the devices,
  the method comprising the each device:
    receiving and storing data from a corresponding I/O port,
    transmitting, to the arbiter, information relating to congestion or availability of a corresponding port,
    receiving, from the arbiter, information indicating whether the received data may be transmitted over the data bus,
    transmitting, if the information received indicates that the data may be transmitted, the data over the data bus, and receiving data from the data bus and forward the received data to a corresponding I/O port, and the arbiter:

receiving, from the devices, the congestion or non-availability information, and determining the order of exchanging data on the basis of the congestion information;

the step of a Look-Up Engine receiving information relating to each piece of data received at an I/O port and deriving, from the information, identifying information relating to one or more I/O port(s) or device(s) to receive the piece of data; and wherein the arbiter determines, when more than one port or device is to receive a piece of data received at a receiving device, which of the ports and devices are available or non-congested and transmit information to the receiving device in order to have it forward the data to those ports and devices, and subsequently, when other of the ports or devices are available or non-congested, informs the receiving device to forward the data to those devices or ports.

* * * * *